SINGLE-EDGE TROUGH TAPE GUIDE

Filed Oct. 2, 1967

INVENTOR
DAVID T. L. CHANG
BY Thomas C. Schatzel
ATTORNEY

United States Patent Office 3,501,078

Patented Mar. 17, 1970

3,501,078

SINGLE-EDGE TROUGH TAPE GUIDE

David T. L. Chang, Altadena, Calif., assignor to Ampex Corporation, Redwood City, Calif., a corporation of California Filed Oct. 2, 1967, Ser. No. 672,248
Int. Cl. B65h 23/32
U.S. Cl. 226—198 13 Claims

ABSTRACT OF THE DISCLOSURE

A guide means adapted for a digital tape transport to minimize dynamic skew, the guide means being in the form of a single-edge trough guide and including a flat plate member normal to the surface of the tape and adjacent to one tape edge along a substantial length of the tape, at least two urging members, e.g. spring loaded washers, spaced apart and engaging the other tape edge constantly urging the tape against the plate.

BACKGROUND OF THE INVENTION

The present invention relates to an improved tape guide means for a tape transport and more particularly to a single-edge trough guide for guiding the tape past a head assembly for minimizing relative angular movement (dynamic skew) and lateral movement.

Magnetic tape transports are being increasingly sophisticated with more demands being placed on the mechanical and electronic sectors. Demands for increased tape speed, high recording densities, minimal start and stop times, less cost, etc., are constantly being made. All these require continuous refinements and improvements in the systems both mechanically and electrically.

One problem that must be guarded against in the operation of a tape transport system is tape misalignment with relationship to the magnetic head. The misalignment, which may appear in the form of dynamic skew or/and lateral movement, must be minimized particularly where large data storage density is employed. If the tape is skewed or laterally misaligned, erroneous information processing may result. Possibly, the head portion at one side of the tape will be reading from one frame multiset character while the head portion at the other side reads from the next frame. Correcting means for tape misalignments are important factors at all speeds, and particularly at high tape speeds and accelerations where large force impulses are encountered tending to cause or increase the misalignments.

Magnetic tapes commonly available today, and prepared under normal manufacturing processes, are "wavy" or curved at the edges. Though the tape width may be substantially constant dimensionally, the edges are not straight. As a general rule, the waviness for a specific tape is generally constant so that the perid between maximum points of deviation (crests) along the edge are relatively evenly spaced. Generally, one-half inch wide magnetic tapes for digital tape transports have a period in the range of approximately six to nine inches.

There have been many attempts to overcome the shortcomings encountered with dynamic skew and "wavy" tape. Flanged rollers is one approach but they frequently result in tape damage where there is a slight misalignment. Also, dimensional tolerances of tapes and parts pose limitations. Another approach has been to use a spring loaded, fixed-flange roller or stationary post with air lubrication. This design incorporates a spring force to push tape against the flange. However, the waviness of the tape results in lateral movement and skew and also the flange material requires extremely high abrasive resistance. A further approach has been a double-edge trough guide.

In general, favorable results have been realized for the transports heretofore available, but still the effectiveness is limited by the tolerances of the tape and parts.

SUMMARY OF THE INVENTION

The single-edge trough guide of the present invention minimizes both angular movement and lateral movement of the tape as it passes the head assembly or data processing center. On one side of the tape path and normal to the tape surface is a flat plate means. On the opposite side of the tape path is an urging means, e.g. a spring loaded washer referenced with a flat surface, engaging one longitudinal edge of the tape and constantly urging the tape against the plate. Simultaneously, the tape is maintained in contact with the head assembly for processing of the data. A preferred embodiment includes a long flat plate means mounted on the transport adjacent and normal to the tape path. On each side of the head is a guide normal to the plate for guiding tape past the head. The length of the tape path adjacent the plate is preferred to be at least equivalent to two periods of waviness of the tape, through shorter lengths have provided favorable results. Concentric and encircling each guide is a washer biased by a spring. The washer engages the opposite edge of the tape constantly urging it against the plate while the tape is moving on the guide. Thus, the variations in the tape edge are compensated by the spring loaded washer and the tape is assured of contact with the plate. Therefore, the angular and lateral tape movement are minimized. Also, since the contact area of the tape and plate is large, the plate material need not be extremely hard.

DESCRIPTION OF THE PREFERRED EMBODIMENT

Figure 1:
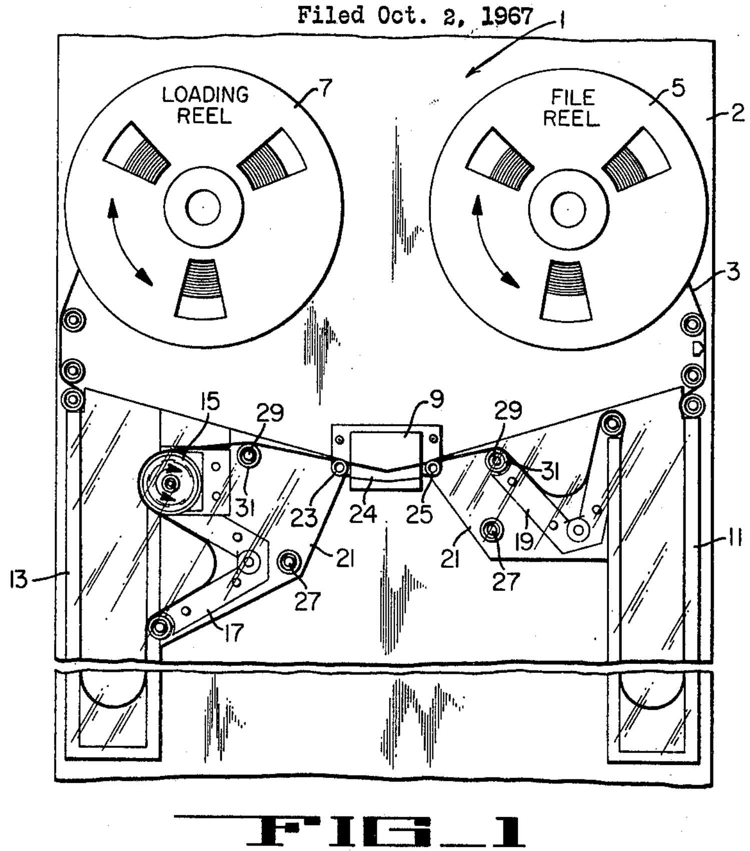
FIG. 1 is a view of a partial front panel of a tape transport employing the present invention.

FIG. 1 illustrates the tape path and associated components of a high speed tape transport incorporating the guide of the present invention. The illustrated transport is referred to by the general reference character 1 and includes only the elements necessary for an understanding of the preferred embodiment. United States patent application Ser. No. 672,224 filed concurrently herewith includes a detailed explanation of the transport 1. The transport 1 includes a flat mounting panel 2. A tape 3 is transported between a supply means in the form of a file reel 5 and a loading reel 7 past a data processing center including a magnetic record/reproduce head assembly 9, all mounted on the panel 2. The tape 3 may be a multiple channel medium carrying high density digital data to be processed. Tape densities of 800 characters per inch or more and transported at speeds of up to 150 inches per second or more are in common demand. Obviously, for reliable processing, it is essential that all characters of each channel be properly aligned with respect to the head 9 when passing thereby.

The transport 1 includes buffer means in the form of a pair of vacuum chambers 11 and 13, adjacent the supply reel 5 and loading reel 7, respectively. As is well known in the art, the vacuum chambers alleviate otherwise intolerable tension differentials. In FIG. 1, the chambers 11 and 12 and panel 2 are broken away to conserve space. The chambers form loops in the tape the length of which is sensed by sensor means (not shown). The sensor means in turn provide signals for servo controlling the associated reels 5 and 7. The tape velocity, acceleration and deceleration intermediate the vacuum chambers 11 and 13 is realized, at least in part, by a bidirectional driving capstan 15 which is individually servo controlled through a capstan motor (not shown) coupled to the capstan. Adjacent the capstan 15 is a V-shaped vacuum damper recess 17, one function of which aids in providing adequate wrap-around of the tape 3 with the capstan 15. The capstan 15 and the recess 17 are outside the vacuum chamber 13 and positioned so as to distort the natural path of the tape loop formed by the chamber 13. Part of the outer periphery of the capstan 15 extends over the chamber engaging the tape surface. The recess 17 forms a further loop in the tape so as to increase the wrap-around angle of the tape 3 with the capstan 15. Intermediate the head 9 and chamber 11 is a second V-shaped vacuum chamber 19, the function of which, in part, is to minimize tape tension excusions.

Adjacent to the path of the tape 3, intermediate the vacuum chamber 11 and 13, and normal to the tape surface is a flat plate means illustrated in the form of a pair of plates 21 mounted on opposite sides of the head assembly 9. The plates 21 are raised from and parallel with the panel 2 and secured in place by a pair of stationary reference pins 23 and 25 to form a trough through which the tape 3 is transported. The pins 23 and 25 are precisely dimensioned to secure the plate 21 in the proper position from the panel 2 to accommodate the tape 3. The actual dimensions are dependent upon the width of the tape 3. The pins 23 and 25 are also positioned so as not to make contact with the tape 3 when transported. The tape path when the transport 1 is in the operational mode, is above the pins and intimate with the head 9. The head assembly 9 may include a head gate 24 which includes appropriate shielding between the record and reproduce transducers. The plates 21 are further secured by a multiple of other precisely dimensional pins 27, all dimensioned dependent upon the width of the tape 3.

Figure 2:
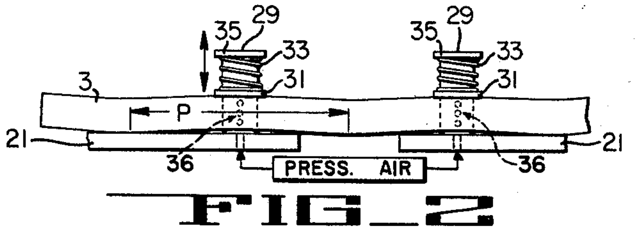
FIG. 2 is a diagrammatic top view of the guide of the present invention.

The path of the tape 3 also includes an urging means for continuously urging the tape 3 against the plates 21. The urging means should be adequately resilient to move away and towards the plates as it encounters the "wavy" fluctuations of the tape edge. As illustrated, the urging means may be in the form of a pair of stationary tape guides 29 spaced apart on opposite sides of the head assembly 9 (see FIGS. 2 and 3). The tape 3 passes over the guides 29 and is continuously urged against the plates 21 by a disc 31 concentric with each guide, as depicted in FIG. 2. The discs 31 are subject to the resilience or biasing force of a spring 33 such as a concentric coil spring which is intermediate the edge of the tape 3 and the panel 2. The positioning reference surface for the spring 33 may be the flat surface of the panel 2 or the flat surface of a flat internal flange 35 on the shank of the guide 29. Accordingly, any change in tape width or waviness of the edge is compensated for by the expansion or contraction of the spring 33. Thus, the discs 31 maintain constant bias on the tape towards the plates 21 so that the tape 3 is in continuous contact with the plates.

Figure 3:
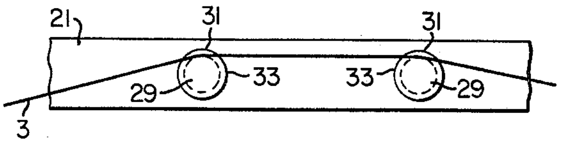
FIG. 3 is a diagrammatic front view of the guide of the present invention.

In FIGS. 2 and 3, which diagrammatically illustrate the relationship of the guides 29, reference plates 21 and tape 3, the head assembly 9 is deleted and the lateral positional relationship of guides 29 along the tape path altered from that shown by FIG. 1. The guides 29 are preferably designed to make minimal frictional contact with the tape 3. Stationary air lubricated members supplying pressurized air through orifices 36, or low friction roller type guides are preferable. In either event the frictional contact between the guide and tape surface is minimized compatible with minimal tape wear. The tape 3 passes over the guides 29 so that the non-oxide or non-recording surface is adjacent to the guide surface.

The tape 3 in FIG. 2 is drawn to indicate the waviness of the tape. Obviously, to illustrate the point the degree of "waviness" is exaggerated. As a practical matter under modern manufacturing processes, the degree of waviness is in the order of 0.004 inch for one-half inch tape. Accordingly, the guides 29 are selected so that when the biasing springs 33 are in a stable position, the distance between the plate 21 and disc 31 is slightly less than the minimum width of the tape, e.g. 0.495 inch for a one-half inch tape. The period P of the wave, has been generally found to be in the order of six to nine inches. The dimensions of the plates 21 are selected such that for the particular tape path involved, the tape can make contact with the plates along a substantial part of the path. It has been found preferable for the tape to make contact at least at two points. Thus, the plate is preferably of a length to accommodate at least two periods of the tape wave. However, it has been found that lateral and angular movement is decreased even where the length is not equal to two periods. Where the length is at least one period but less than two periods, continuous contact is assured which alleviates displacement problems. The plate material should preferably be of a relatively high abrasive resistant material so that a groove is not worn. However, the material need not necessarily be extremely hard since there is a long contact area, e.g. at least six to nine inches for standard one-half inch computer digital tape. The material composition of the discs 31 depends on the diameter of the guide 29 and the total area of contact with the tape 3. Where the area of contact is relatively small, for example with a one-half inch guide, the disc should preferably comprise a hard material, e.g. a hard ceramic. If the guide is one inch in diameter, a softer material, e.g. hard anodized aluminum, may be used, assuming similar angular degrees of contact. The distance between the two guides 29 is not highly critical but preferably of the order of the period of waviness. It has been found that a positional distance in the order of seven inches is highly satisfactory for a tape having a "waviness" period of six to nine inches. The guides 29 and plates 21 form a single-edge trough and sides of the head 9 to urge the tape intimate with the head assembly 9 for proper data processing. For the illustrated transport 1, the guides 29 are shown so as not to require any wrappping during tape threading operations. The guides 29 and plates 21 form a single-edge through and the tape 3 may be placed within the trough over the guides 29. When the vacuum source is activated, the vacuum chambers establish a tension in the tape urging it down and intermediate the discs 31 and plates 21. It is further preferable that the surface of the mounting panel 2 and plates 21 be as flat as possible to accommodate the tape path. In present designed systems it has been found desirable and adequate to maintain the flatness of the panel and plate within 0.0005 inch. Also, the longitudinal length of the guides 29 and reference pins have been maintained within 0.0005 inch.

Accordingly the single-edge trough guide disclosed herein provides a means for minimizing angular and lateral movement of the tape during transport, thus improving reliability, accuracy and overall efficiency of the data processing. It should also be noted that there are cost savings since it allows for the deletion of deskewing electronics which has been necessary in systems heretofore available.

It should also be realized that though the illustrated embodiment indicates the guided tape path displaced on both sides of the data processing center 9, this is not essential. For a unidirectional transport the guides 29 and plate means 21 could all be on one side of the head assembly. However, for bidirectional machines it is preferable, though not essential, that the single-edge trough guide be sectioned so that part is on each side of the head so that equal effectiveness is realized regardless of the direction of tape travel.

It should be understood that various changes in the details which have been herein described and illustrated in order to explain the nature of the invention, may be made by those skilled in the art within the principles.

I claim:

1. In combination with an elongated longitudinal moving tape medium having at least one wavy edge presenting crests of predetermined periodic spacing, a guide means for guiding said tape medium in a tape transport system past a data processing center comprising:

a first positioning reference surface adjacent to one edge of the path of said tape;

a flat plate means opposite the positioning reference surface and parallel thereto, for continuous engagement with the other of said wavy edges at a plurality of said spaced crests thereof, the plate being displaced from the reference surface a distance greater than the width of said tape to be transported to form a trough for said tape; and an urging means referenced to the positioning reference surface and adapted to continuously contact said one edge of said tape at least two spaced points and continuously urge the other tape edge towards the flat plate means.

2. The tape guide of claim 1 in which the urging means includes a pair of tape guides spaced apart adjacent said tape path each carrying a spring member intermediate the tape path and the reference surface, said spring members adapted to continuously urge said tape against the flat plate means.

3. The tape guide of claim 2 in which the length of the plate means along the tape path is at least equal to one period of the periodic wave of said tape.

4. The tape guide of claim 2 in which the tape guides are spaced apart along the tape path a distance approximately equal to one periodic wave of the tape edge.

5. The tape guide of claim 4 in which the tape guides are positioned on opposite sides of a data processing center adjacent said tape path.

6. The tape guide of claim 5 in which the tape guides are spaced apart along the tape path a distance at least approximately equal to one periodic wave of the tape edge, and the length of the plate means along the tape path is at least equal to two periods of the periodic wave of said tape.

7. The tape guide of claim 6 in which the urging means include a pair of circular tape guides extending intermediate the reference surface and the flat plate means, each guide carrying a coil spring intermediate the reference surface and said one edge of the path, said coil springs adapted to constantly urge said tape against the flat plate means.

8. The tape guide of claim 7 in which the circular tape guides are in the form of a pair of stationary air-lubricated guides.

9. The tape guide of claim 7 in which the circular tape guides are in the form of a pair of low friction roller guides.

10. The tape guide of claim 6 in which each guide further includes a disc member concentric with said coil spring and intimate with the associated coil spring intermediate said one edge of the path for contact with said tape.

11. In combination with an elongated longitudinally moving tape having at least one wavy edge presenting crests of predetermined periodic spacing, a tape guide comprising:

a flat plate guide means mounted normal to the width of said tape for continuous engagement with one of said wavy edges at a plurality of said spaced crests thereof; and an urging means engaging the other one of said tape edges opposite said plate means and urging said tape into said engagement with said plate.

12. The tape guide of claim 11, in which:

said flat plate means comprises two plate portions each as long as the periodic spacing between said wavy tape edge crests.

13. The tape guide of claim 12, in which:

said two plate portions are spaced apart along the length of the tape; and tape transducing means are mounted between said spaced plate portions.

References Cited

UNITED STATES PATENTS

| | | | |
|---|---|---|---|
| 2,142,606 | 1/1939 | Debrie | 226—198 |
| 2,726,859 | 12/1955 | Dolamore | 226—198 X |
| 3,276,651 | 10/1966 | Bryer | 226—198 X |
| 3,347,437 | 10/1967 | Rush | 226—198 |
| 3,371,835 | 3/1968 | Pendleton | 226—198 X |

ALLEN N. KNOWLES, Primary Examiner